Dec. 23, 1930.  T. G. PATE  1,786,363
BURGLAR GUARD APPARATUS
Filed Nov. 29, 1929   2 Sheets-Sheet 1
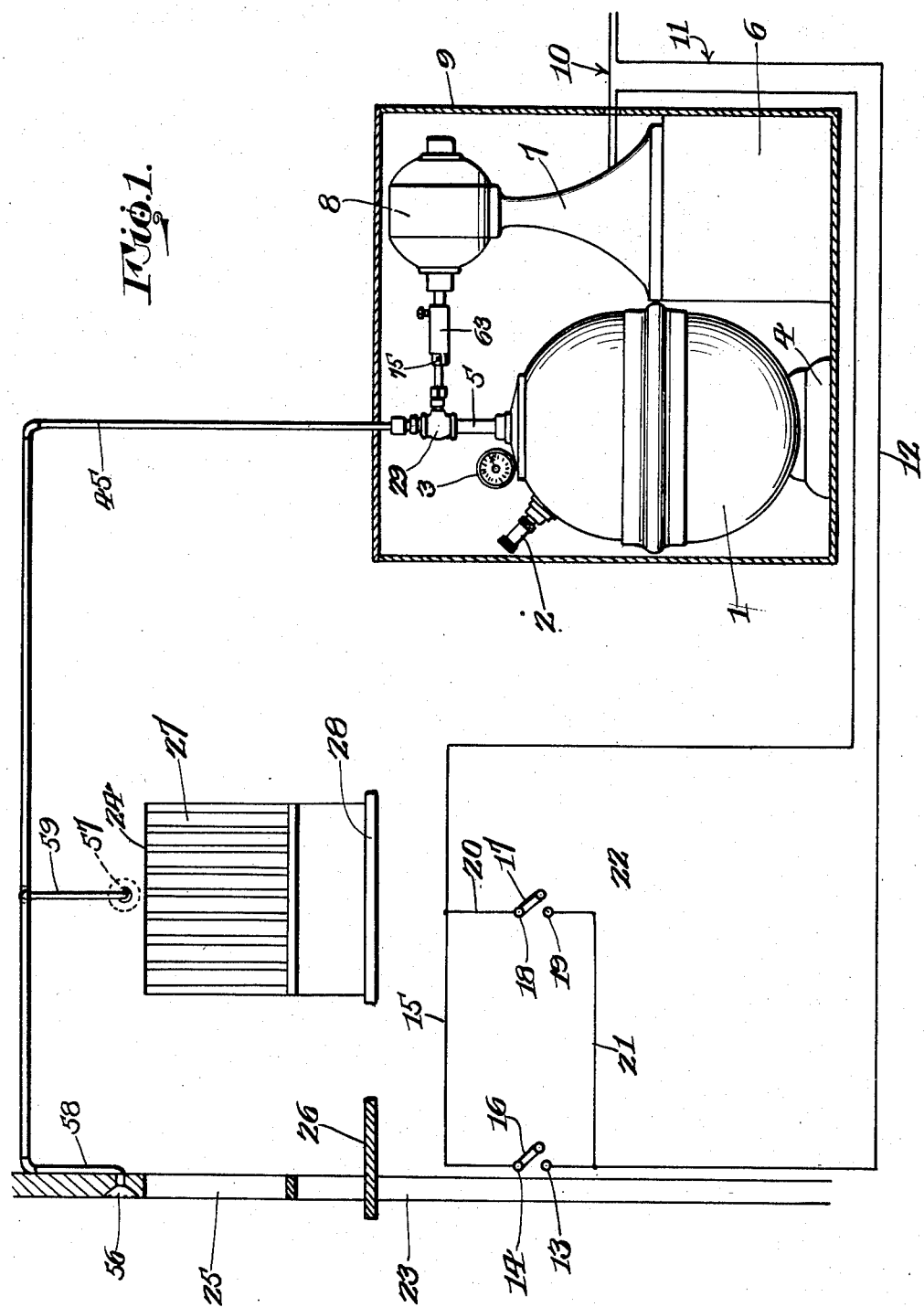
INVENTOR.
Thomas G. Pate,
BY
Geo. P. Kimmel
ATTORNEY.

Dec. 23, 1930.  T. G. PATE  1,786,363
BURGLAR GUARD APPARATUS
Filed Nov. 29, 1929  2 Sheets-Sheet 2
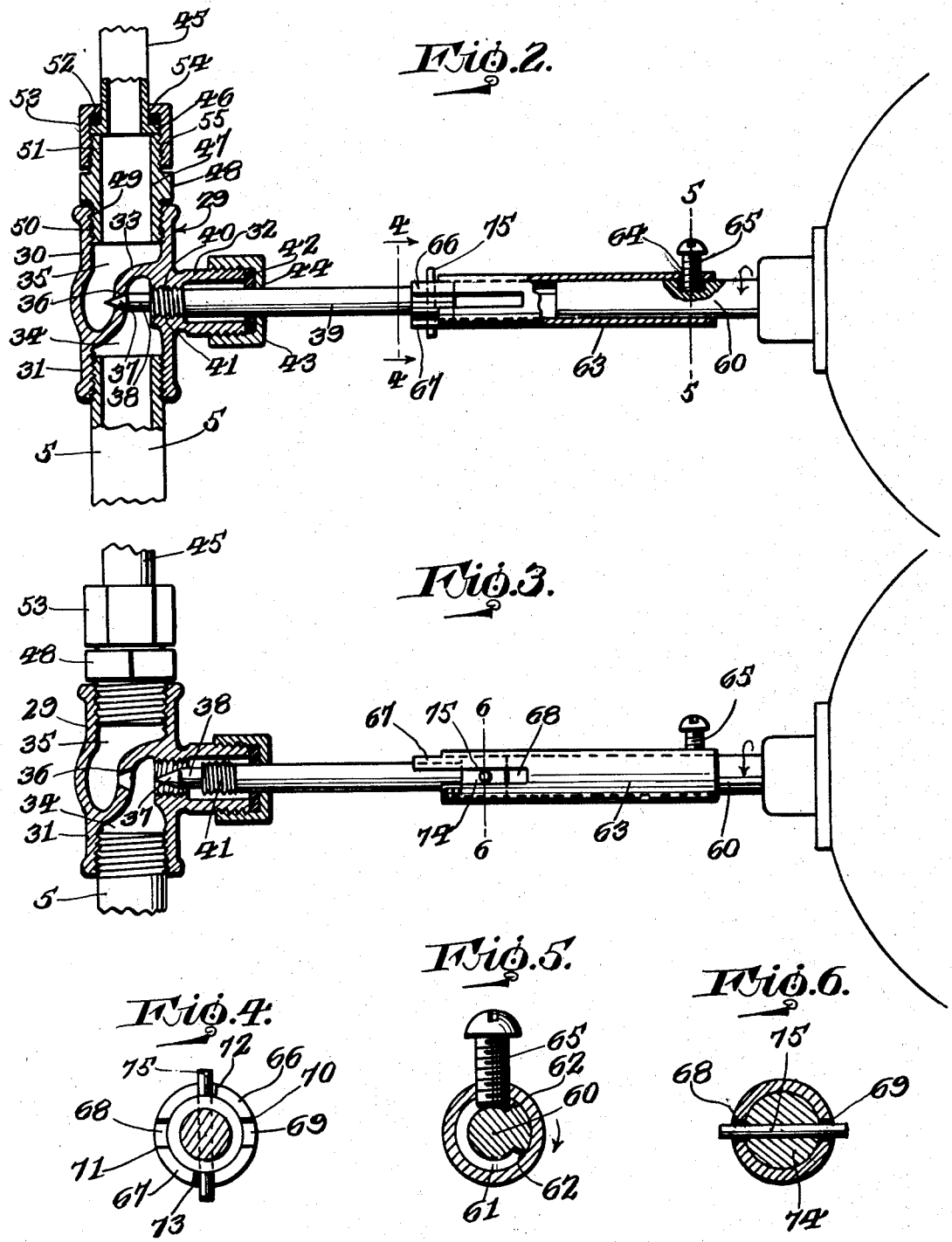
INVENTOR.
Thomas G. Pate,
BY
Geo. P. Kimmel
ATTORNEY.

Patented Dec. 23, 1930

1,786,363

UNITED STATES PATENT OFFICE

THOMAS G. PATE, OF LIBERAL, KANSAS

BURGLAR-GUARD APPARATUS

Application filed November 29, 1929. Serial No. 410,619.

This invention relates to a burglar guard apparatus designed primarily for use in financial and other institutions handling large cash receipts, and has for its object to provide, in a manner as hereinafter set forth, an apparatus of such class for protection against robberies or holdups.

The invention has for its further object to provide, in a manner as hereinafter set forth, an apparatus of the class referred to capable when operated for discharging an agent into the face of the burglar for blinding or rendering him helpless.

A further object of the invention is to provide, in a manner as hereinafter set forth, an apparatus of the class referred to capable of being installed in financial and other institutions handling large cash receipts and capable of being thrown into operation at spaced points desired for discharging an agent into the face of the burglar or against the burglar or so that the burglar will come in contact therewith for the purpose of blinding or rendering the burglar helpless.

Further objects of the invention are to provide, in a manner as hereinafter set forth, an apparatus for the purpose referred to which is simple in its construction and arrangement, strong, durable, compact, including suitable means to provide for the activity of the apparatus, thoroughly efficient in its use, readily installed and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a burglar guard apparatus, in accordance with this invention, showing the installation thereof with respect to a teller's cage.

Figure 2 is a fragmentary view in section illustrating the controlling valve for the blinding agent reservoir secured in closing position and further illustrating a driven coupling means connected with the valve for shifting the latter to a position to open the reservoir.

Figure 3 is a view similar to Figure 2 with the controlling valve shifted to a position to open the blinding agent reservoir.

Figure 4 is a section on line 4—4 of Figure 2.

Figure 5 is a section on line 5—5 of Figure 2.

Figure 6 is a section on line 6—6 of Figure 3.

The apparatus includes one or more discharge nozzles for the blinding agent, the latter preferably being tear gas under pressure. The nozzle or nozzles is or are to be substantially concealed in a support therefor. The apparatus also includes an electric motor having the power line therefor in a normally open circuit capable of being closed at one point or selectively closed at a plurality of points remote from each other when occasion requires.

The apparatus also includes a blinding agent reservoir provided with an outlet carrying a controlling valve mechanism including a valve member for normally closing said outlet and shifted from the motor, when the motor circuit is closed to a position to open the outlet to enable the discharge of the blinding agent to render the burglar helpless or to prevent him from acting to carry out burglary.

An embodiment of the invention is illustrated by way of example in connection with a teller's cage.

Referring to the drawings in detail, 1 denotes a reservoir for containing tear gas under pressure and which includes an intake 2 and a pressure gauge 3. The reservoir 1 is mounted upon a suitable support 4. The upper end of reservoir 1 has extending therefrom an outlet pipe 5 for the blinding agent. Adjacent the reservoir 1 a base member 6 is arranged carrying a pedestal 7 for an electric motor 8. The reservoir 1 and motor 8 are installed in a closed housing 9. The power circuit lines for the motor 8 are indicated at 10, 11 generally. The line 11 includes a section 12 which leads from the source of electrical energy to a switch point 13 and also includes a branch 14 which leads from another switch point 15 to the motor. The line 11 leads directly from the source of energy to the motor. A switch member 16 coacts with the points 13, 14 for closing the power circuits for the motor. The line 10 and branch 15 extend through one side of the housing 9. As the insulation of the apparatus is shown by way of example in connection with a teller's cage provided with a pair of teller's counters, the power circuit for the motor is so set up that it can be selectively closed at two points remote from each other, the closing of one point being provided by the switch member 16 and the closing at the other point by a switch member 17 coacting with the switch points or posts 18, 19.

Leading from the switch point or post 18 to the branch 15 is a circuit connection 20 and leading from branch 12 to switch point or post 19 is a circuit connection 21. The form of switch shown is illustrated by way of example, but it is to be understood that any suitable type of switch for the purpose intended may be employed.

The teller's cage is generally indicated at 22 and one wall thereof at 23 and another wall at 24. The wall 23 is provided with a teller's window 25 and a teller's counter 26. The wall 24 is formed with a teller's window 27 and a teller's counter 28, the latter being disposed at right angles with respect to the counter 26 and spaced a substantial distance therefrom.

With reference to Figures 2 and 3 there is illustrated a T-shaped controlling valve housing referred to generally at 29 and formed of a pair of vertical legs 30, 31, a horizontal leg 32 disposed at right angles with respect to the legs 30, 31, and an internal web of wall 33 which extends from the inner face of the leg 30 above the leg 32 and terminates in the inner face of the leg 31 below the leg 32. The web 33 provides the housing 29 with a lower intake chamber 34 and an upper outlet chamber 35. Communication is established between the chambers 34 and 35 by an opening 36 formed centrally of the web 33 and having a bevelled wall to constitute a seat for the tapered pointed end 37, of a needle valve 38, formed with an elongated stem 39 of circular cross section and which is of greater diameter than the diameter of the valve 38. The body of the housing 29 is formed with an opening 40 and which extends at right angles with respect to the upper end of the chamber 34 and extends from the latter and opens into the leg 32. The opening 40 is of less diameter than the inner diameter of leg 32, disposed concentrically of the latter and has the wall thereof threaded.

The stem 39 has a peripherally threaded terminus 41 which engages with the threaded wall of the opening 40 for the purpose of maintaining valve 38 seated to shut off communication between the chambers 34 and 35. Mounted against the outer end of the leg 32 is a packing member 42 in the form of an annulus and which is secured against leg 32 by a cap member 43 having peripheral threaded engagement with the leg 32. The cap member 43 has a central opening 44. The stem 39 extends through the leg 32, packing 42 and opening 44 and is of a diameter to have a snug sliding fit with the wall of the opening 44.

The leg 31 is formed with internal threads for engagement with the peripheral threads in the upper end of the pipe 5 whereby the valve housing 29 is coupled with pipe 5 and disposed vertically with respect to the latter.

A blinding agent conducting line is indicated at 45 and at its rear end is formed with a right angularly disposed annular flange 46 which seats upon the upper end of a tubular union 47 formed centrally of its periphery with a boss 48. Preferably the inner diameter of the line 45 is less than the inner diameter of the union 47. The lower part of the outer periphery of the union 47 is threaded, as at 49 for engagement with the internal threads 50 of the leg 30 for the purpose of connecting union 47 to leg 30 and to maintain union 47 vertically relative to said leg.

The inner diameter of the union 47 is less than the inner diameter of the leg 30 and the union 47 has the upper portion of its periphery threaded as at 51. Surrounding the line 45 and mounted on the flange 46 is a packing member 52 which is engaged by a coupling piece 53 for maintaining it under a state of compression. The coupling piece 53 at its outer end includes an inwardly extending, annular flange 54 which seats on the packing 52 and surrounds the line 45. The coupling piece 53 is provided with internal threads 55 for engagement with the peripheral threads 54 on the union 47 whereby line 45 is coupled to the latter.

The line 45 is provided with one or more discharge nozzles, depending upon the number of outlets desired for line 45 and as shown the latter includes a pair of discharge nozzles 56, 57, the former being countersunk in the wall 23 and the latter countersunk in the wall 24. The countersinking of the nozzles 56, 57 substantially cancel the same. The nozzles 56, 57 are disposed in close proximity to the top of the teller's windows 25, 27 respectively, and preferably centrally of the top. The line 45 includes an extension 58 which opens into the nozzle 56 and further includes an extension 59 which opens into the nozzle 57, the arrangement being such that when the power circuit for the motor is closed, the blinding agent will be discharged from both nozzles so as to affect the burglar in a manner to blind him or render him helpless or to prevent any activity by the burglar.

The controlling valve 38 is normally secured in position to close the opening 36 whereby the reservoir 1 is closed to the line 45. The valve 38 is normally secured in position to close the opening 40 by the engagements of the threads of the stem 39 with the threaded wall of the opening 40. To provide for quick release and shift of valve 38 from closing position with respect to opening 36, so that the discharge through opening 36 will not be gradual, but full, the stem 39 is coupled with the shaft 60 of the motor 8, in a manner to be presently referred to. The coupling connection is such as to enable the motor to pick up its speed, before shaft 60 will act to release valve 38, under such conditions the release will be quck, similar to what may be termed a quick hammer action thereby providing for full discharge of the blinding agent substantially at the same time the valve is released.

The driving coupling connection between stem 39 and shaft 60 is clearly shown in Figures 2 and 3, as well as Figures 4, 5 and 6. Shaft 60, at a substantial distance from its outer end is formed with a peripheral groove 61 approximately two-thirds of its circumference. The end walls of the groove 61 provide stops 62. Mounted on the shaft 60 and extending a substantial distance therefrom is a sleeve 63 which has its inner ends project inwardly beyond the groove 61. The sleeve 63 in proximity to its inner end is formed with an opening 64 having a threaded wall and engaging with the latter is a screw 65 which extends through the opening 64 and into the groove 61. The screw 65 detachably couples and connects the sleeve 63 with the shaft 60 and further acts as an abutment coacting with the shoulder 62 to provide for the sleeve 63 being bodily carried by shaft 60 when the latter is rotating.

The sleeve 63 at its outer end is formed with a pair of diametrically opposed, lengthwise extending projections 66, 67. The sleeve 63 is also formed with a pair of diametrically opposed, lengthwise extending slots 68, 69 opening at the edge of the sleeve. One side edge of the extension 66 and which is indicated at 70 forms a continuation of one of the walls of the slot 69. One side edge of the extension 67 and which is indicated at 71 forms a continuation of one wall of the slot 68. The other side edge of the extension 66 and which is indicated at 72 forms a stop. The other side edge of the extension 67 and which is indicated at 73 provides a stop. The outer end of the stem 39 is formed with a head 74 of greater diameter than the remaining portion of the stem and of a diameter corresponding to the diameter of the shaft 60.

Extending diametrically of the head 74, as well as projecting therefrom from both sides thereof is a pin 75 of a length to project through and beyond the notches 68, 69. The pin 75 acts to couple the stem 39 with the sleeve 63 and as the latter is coupled with the shaft 60 the stem 39, sleeve 63 and shaft 60 will bodily rotate together when the pin 75 is arranged in the notches 68, 69.

The normal position of the sleeve 63 and screw 65, is as shown in Figures 2 and 5. The inner end of the screw 65 is arranged in groove 61 in proximity to the upper stop or abutment 62. The shaft 60 operating in the direction of the arrow, will bodily carry the sleeve 63 therewith until the lower stop or abutment 62 is brought into engagement with the inner end of screw 65. The sleeve 63 will not rotate stem 39 until the ends of the pin 75 abut the edges 70, 71 of the extensions, and by this time the motor has picked up its speed and will provide for a quick release of the valve and the latter will be instantly shifted from the position shown in Figure 2 to that shown in Figure 3 to provide for a full discharge from the reservoir. The motor is thrown into operation to provide for the foregoing function by closing the power circuit for the motor. The valve 38 is to remain in its released position until the contents of the reservoir are exhausted. The valve 38 is restored to its normally secured position by removing the screw 65, shifting sleeve from engagement with the pin 75 and manually rotating stem 39 to restore the valve to the position shown in Figure 2.

It is to be understood that the normally open power circuit for the motor can be closed by any suitable means, positioned at any desired point and operated by hand or foot and the means illustrated for closing the power circuit for the motor is shown by way of example.

It is thought that the many advantages of a burglar guard apparatus, in accordance with this invention can be readily understood, and although the preferred embodiment of the invention is as illustrated and described, yet it is to be understood that changes in the details of construction can be had which fall within the scope of the invention as claimed.

What I claim is:

1. In a burglar guard apparatus of that type including a conducting line for tear gas, the combination of a reservoir containing an agent under pressure and having an outlet adapted to communicate with said line, a valve normally closing the outlet, a motor normally in an open power circuit, means for closing said circuit to make the motor active, and means operated from the motor for quickly shifting said valve to establish communication between the line and the outlet.

2. In a burglar guard apparatus of that type including a conducting line for tear gas, the combination of a reservoir containing an agent under pressure and having an outlet adapted to communicate with said line, a valve normally closing the outlet, a motor normally in an open power circuit, means for closing said circuit to make the motor active, and means operated from the motor for quickly shifting said valve to establish communication between the line and the outlet, said last mentioned means having coacting elements to prevent the shifting of the valve until the motor has picked up its speed thereby providing for a quick shift of the valve.

3. In a burglar guard apparatus of that type including a conducting line for tear gas, the combination of a reservoir containing an agent under pressure and having an outlet adapted to communicate with said line, a valve normally secured in position to close the outlet, a motor normally in an open power circuit, means for closing said circuit to make the motor active, and connections between the valve and the shaft of the motor for quickly releasing the valve, when the motor is active to provide for the establishing of communication between the line and the outlet.

4. In a burglar guard apparatus of that type including a conducting line for tear gas, the combination of a reservoir containing an agent under pressure and having an outlet adapted to communicate with said line, a valve normally secured in position to close the outlet, a motor normally in an open power circuit, means for closing said circuit to make the motor active, and connections between the valve and the shaft of the motor for quickly releasing the valve, when the motor is active to provide for the establishing of communication between the line and the outlet, said connections having coacting elements to prevent the shifting of the valve until the motor has picked up its speed thereby providing for the quick shift of the valve.

In testimony whereof, I affix my signature hereto.

THOMAS G. PATE.